(12) United States Patent
Cheng et al.

(10) Patent No.: US 8,254,312 B2
(45) Date of Patent: Aug. 28, 2012

(54) INCREASING RELIABILITY OF HYBRID AUTOMATIC REPEAT REQUEST PROTOCOL

(75) Inventors: Jung-Fu Cheng, Cary, NC (US); Daniel Larsson, Solna (SE); Sorour Falahati, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 518 days.

(21) Appl. No.: 12/466,884

(22) Filed: May 15, 2009

(65) Prior Publication Data

US 2009/0285160 A1   Nov. 19, 2009

Related U.S. Application Data

(60) Provisional application No. 61/053,237, filed on May 15, 2008.

(51) Int. Cl.
    *H04B 7/216*   (2006.01)
(52) U.S. Cl. ..................... 370/328; 455/452.2
(58) Field of Classification Search .................. 370/328, 370/329, 335
    See application file for complete search history.

(56) References Cited

U.S. PATENT DOCUMENTS

| 7,027,420 B2 * | 4/2006 | Hamalainen ................ 370/335 |
| 2010/0061345 A1 * | 3/2010 | Wengerter et al. ........... 370/335 |
| 2011/0194524 A1 * | 8/2011 | Hedlund et al. .............. 370/329 |

FOREIGN PATENT DOCUMENTS

WO   WO 2008/135238 A1   11/2008

OTHER PUBLICATIONS

Panasonic: "Ack/Nack Repetition and Implicit Resource Allocation for PUCCH" 3GPP Draft; RI-081796, 3rd Generation Partnership Project (3GPP), Mobile Competence Centre, 650; Route Des Lucioles, F-06921 Sophia-Antipolis Cedex, France, vol. RAN WGI, no. Kansas City, USA; May 14, 2008.
Nokia Siemens Networks et al: "Rank Reporting on PUCCH" 3GPP Draft; R1-081055, $3^{rd}$ Generation Partnership Project (3GPP), Mobile Competence Centre; 650, Route Des Lucioles; F-06921 Sophia-Antipolis Cedex; France; vol. RAN WG1, no. Sorrento, Italy; Feb. 15, 2008.

* cited by examiner

*Primary Examiner* — Kevin C Harper
*Assistant Examiner* — Henry Baron

(57) ABSTRACT

In a communication system using HARQ, the problem of false ACK detection when no ACK/NACK feedback is transmitted is solved sent by varying the reliability of the scheduling information transmitted to the user terminal on a downlink control channel depending on whether the user terminal is expected to use a first or second uplink channel for sending ACK/NACK feedback. When the user terminal is expected to use the first channel to send ACK/NACK feedback, the base station transmits scheduling information to the user terminal with normal reliability. When the user terminal is expected to send ACK/NACK feedback on the second uplink channel, the base station transmits the signaling information to the user terminal with enhanced reliability. The reliability of the signaling information can be increased, for example, by increasing the transmit power on the downlink control channel, increasing the aggregation level, or a combination thereof.

14 Claims, 3 Drawing Sheets

INCREASING RELIABILITY OF HYBRID AUTOMATIC REPEAT REQUEST PROTOCOL

This application claims priority to Provisional U.S. Patent Application 61/053,237 filed 15 May 2008, which is incorporated herein by reference.

BACKGROUND

The present invention relates generally to data transmission protocols for transmission of data over a shared downlink channel, and more particularly, to a method and apparatus for increasing the reliability of hybrid automatic repeat request protocols.

The Physical Downlink Shared Channel (PDSCH) in the LTE standard is a time and frequency multiplexed channel shared by a plurality of user terminals. The user terminals periodically send channel quality indication (CQI) reports to the base station. The CQI reports indicate the instantaneous channel conditions as seen by the receivers in the user terminals. During each 1 ms subframe interval, commonly referred to as a Transmission Time Interval (TTI), a scheduler at the base station schedules one or more user terminals to receive data on the PDSCH and determines the transmission format for the downlink transmissions. The identity of the user terminals scheduled to receive data in a given time interval, and the transmission format, is transmitted to the user terminals on the Physical Downlink Control Channel (PDCCH).

Hybrid Automatic Repeat Request (HARQ) is used to mitigate errors that occur during transmission of data on the PDSCH. When the base station indicates that a user terminal is scheduled to receive a transmission on the PDSCH, the user terminal is required to decode the PDSCH and to transmit either a positive or negative acknowledgement (ACK/NACK) to the base station. The ACK/NACK informs the base station whether the data packet was correctly received by the user terminal. If the data packet is correctly received by the user terminal, the base station can proceed with the transmission of new data packets. In the event that the data packet is not correctly received by the user terminal, the base station may either repeat the original transmission or send additional redundancy data to enable decoding of the previously transmitted data packet.

The user terminal may send the ACK/NACK to the base station using one of two possible approaches that depend on whether the user terminal is scheduled to transmit on the Physical Uplink Shared Channel (PUSCH). If the user terminal is not scheduled to transmit on the PUSCH when the ACK/NACK is being sent, the user terminal transmits the ACK/NACK on the Physical Uplink Control Channel (PUCCH). If, however, the user terminal is scheduled to transmit data on the PUSCH, the user terminal uses a portion of the allocated resources to transmit the ACK/NACK on the PUSCH.

The user terminal sends ACK/NACK feedback to the base station only when it has been scheduled to receive data on the downlink shared channel. Due to the nature of the wireless communication channel, it is possible that the user terminal may fail to decode a scheduling message transmitted on the PDCCH. If the user terminal fails to decode the scheduling message transmitted on the PDCCH, the base station will receive user data on the PUSCH where it expects to receive ACK/NACK feedback. There is some possibility in this situation for the base station to misinterpret the user data transmitted on the PUSCH as a positive acknowledgement (ACK) when no acknowledgement was sent by the user terminal. This scenario is referred to herein as the false ACK scenario.

In the case of a "false ACK," the base station will think that the user terminal has successfully received the transmitted packet and will transmit new data the next time the user terminal is scheduled on the downlink. Thus, the user terminal will have to rely on higher layer retransmission protocols (e.g., at the RRC level) to request the missing data, which may result in large delays.

Missed ACKs, though less problematic, may also occur. A missed ACK occurs when the user terminal transmits an ACK which the base station fails to detect. In the case of a missed ACK, the base station will unnecessarily waste system resources retransmitting data to the user terminal which the user terminal has already received.

Prior art attempts to solve the problem of "false ACKs" have focused on increasing the reliability of the ACK/NACK feedback to prevent the base station from misinterpreting user data transmitted on the PUSCH as an ACK. One approach is to increase the number of times the ACK/NACK bit is repeated. In general, increasing the number of repetitions reduces the likelihood of a false ACK where no ACK/NACK feedback was transmitted. However, the number of repetitions required to reduce the false ACK to an acceptable level would significantly reduce the PUSCH resources available for user data and thus decrease throughput. This solution also does not solve the problem of missed ACKs.

Another approach for reducing the number of false ACKs is to designate a reserved bit in the uplink scheduling grant to inform the user terminal whether to reserve resources in the PUSCH for ACK/NACK feedback. More specifically, the base station can set the reserved bit to "1" when it schedules the user terminal and expects ACK/NACK feedback on the PUSCH to instruct the user terminal to reserve resources on the PUSCH for ACK/NACK feedback. If the user terminal fails to decode the PDCCH, it transmits a NACK on the reserved resources. The reservation approach, however, is not applicable in all circumstances, since it relies on the presence of an UL scheduling grant associated with the PUSCH. It is therefore not applicable when the user terminal is performing a non-adaptive retransmission or when the user terminal is transmitting in semi-persistent PUSCH, both of which are expected to be common in LTE. This solution also does not solve the problem of missed ACKs.

Another approach to the problem of false ACKs is to mask the PUSCH CRC bits transmitted by the user terminal with the user terminal identity number if the user terminal is transmitting ACK/NACK feedback on the PUSCH. This approach may interfere with normal HARQ processes and therefore be difficult to implement. First, when the user terminal is retransmitting a previous data block, the PUSCH CRC bits cannot be modified. The PUSCH Block Error Rate (BLER), which is usually in the range of 10-40%, is much higher than that of the ACK/NACK error rates. Hence, even if the user terminal does mask the CRC with user terminal identity number, it is very likely the base station will find that both the masked and unmasked CRC bits fail because the entire PUSCH block in error. Hence, the base station is still constantly facing the same uncertainty problem as in the baseline solution. Secondly, the ACK/NACK feedback signal of a previous PDSCH cannot be unknown until the PUSCH is decoded. This would introduce additional delay in the HARQ run-trip time. As a result, either the number of HARQ processes has to be increased or the entire base station hardware needs to be re-dimensioned.

Accordingly, there remains a need for a new approach to reduce the probability of a false ACK being detected when no ACK/NACK is transmitted by the user terminal.

SUMMARY

The present invention relates to a HARQ process in a mobile communication system where data is transmitted to the user terminals over a shared downlink channel and the ACK/NACK feedback may be transmitted on either a first or second uplink channel. The present invention solves the problem of false ACK detection when no ACK/NACK feedback is sent by varying the reliability of the scheduling information transmitted to the user terminal on the downlink control channel (e.g., PDCCH) when the user terminal is scheduled to receive data packets depending on whether the user terminal is expected to use a first uplink channel (e.g., PUCCH) or a second uplink channel (e.g., PUSCH) for ACK/NACK feedback. In a typical implementation, the signaling parameters for the first and second uplink channels will be designed so that the first uplink channel will have higher reliability and a lower error rate. When the user terminal is expected to use the first channel for sending ACK/NACK feedback, the base station may transmit scheduling information to the user terminal on the downlink control channel with normal reliability. When the user terminal is expected to transmit the ACK/NACK feedback on the second uplink channel, the base station may transmit the signaling information to the user terminal on the downlink control channel with enhanced reliability. The reliability of the signaling information can be increased, for example, by increasing the transmit power on the downlink control channel, increasing the aggregation level, or a combination thereof.

DETAILED DESCRIPTION

Figure 1:
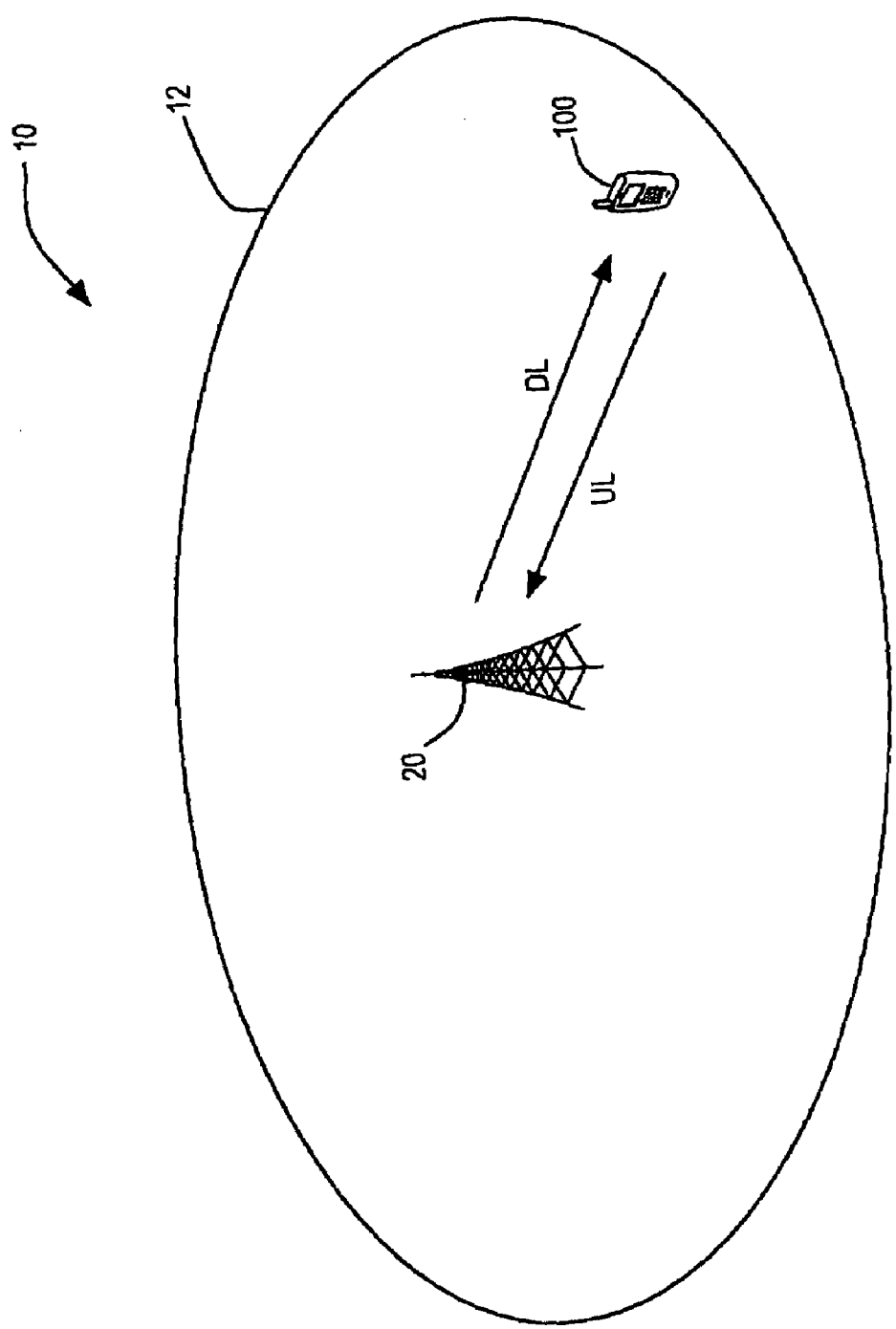
FIG. 1 illustrates an exemplary mobile communication system.

Referring now to the drawings, FIG. 1 illustrates a user terminal 100 in a mobile communication network 10. The user terminal 100 may comprise, for example, a cellular telephone, personal digital assistant, smart phone, laptop computer, handheld computer, or other device with wireless communication capabilities. User terminal 100 communicates with a base station 20 in a serving cell or sector 12 of the mobile communication network 10. The user terminal 100 receives signals from the base station 20 on one or more downlink (DL) channels and transmits signals to the base station 20 on one or more uplink (UL) channels.

For illustrative purposes, an exemplary embodiment of the present invention will be described in the context of a Long Term Evolution (LTE) system. Those skilled in the art will appreciate, however, that the present invention is more generally applicable to other wireless communication systems, including Wideband Code-Division Multiple Access (WCDMA) and WiMAX (IEEE 802.16) systems.

In LTE systems, data is transmitted to the user terminals 100 over a downlink channel known as the Physical Downlink Shared Channel (PDSCH). The PDSCH is a time and frequency multiplexed channel shared by a plurality of user terminals 100. During each 1 ms subframe interval, commonly referred to as a Transmission Time Interval (TTI), a scheduler in base station 20 schedules one or more user terminals 100 to receive data on the PDSCH. The user terminals 100 scheduled to receive data in a given TTI are chosen based on Channel Quality Indication (CQI) reports from the user terminals 100. The CQI reports indicate the instantaneous channel conditions as seen by the receiver at the user terminals 100. The base station 20 also uses the CQI reports from the user terminals 100 to select the transmission format for the downlink transmissions. The transmission format includes, for example, the transport block size, modulation, and coding, which are selected to achieve a desired error performance.

The transmission format and the identity of the user terminals 100 scheduled to receive data in a given time interval are transmitted to the user terminals 100 in a downlink scheduling message over a downlink control channel, referred to in the LTE standards as the Physical Downlink Control Channel (PDCCH). The PDCCH is a control channel used to transmit Downlink Control Information (DCI), such as downlink, transport formats, HARQ information and transport block size. Each user terminal 100 is assigned a 16-bit Radio Network Temporary Identifier (RNTI) or Cell Radio Network Temporary Identifier (C-RNTI) that is used to identify the user terminal 100. When base station 20 schedules a user terminal 100, it inserts the RNTI of the scheduled user terminal 100 into a downlink scheduling message transmitted on the PDCCH to notify the user terminal 100 that it has been scheduled to receive data on the PDSCH. When user terminal 100 receives a scheduling message containing it own RNTI, the user terminal 100 decodes the associated data transmission on the PDSCH using the transport format indicated in the downlink scheduling message.

Hybrid Automatic Repeat Request (HARQ) is used to mitigate errors that occur during transmission of data on the PDSCH. When the base station 20 indicates that a user terminal 100 is scheduled to receive a transmission on the PDSCH, the user terminal 100 decodes the PDSCH and transmits an acknowledgement message to base station 20. The ACK/NACK informs the base station 20 whether the data packet was correctly received by the user terminal 100. The acknowledgement message could be either a positive acknowledgement (ACK) indicating a successful decoding or a negative acknowledgement (NACK) message indicating a decoding failure. Based on the acknowledgement message received from the user terminal 100, base station 20 determines whether to transmit new data (ACK received) or to retransmit the previous data (NACK received). Those skilled in the art will appreciate that the retransmission may include additional bits (incremental redundancy) not contained in the original transmission.

User terminal 100 may send the ACK/NACK to the base station 20 using one of two possible approaches that depend on whether the user terminal 100 is scheduled to transmit on the Physical Uplink Shared Channel (PUSCH). If the user terminal 100 is not scheduled to transmit data on the PUSCH when the ACK/NACK is being sent, user terminal 100 transmits the ACK/NACK on the Physical Uplink Control Channel (PUCCH). If, however, the user terminal 100 is scheduled to transmit data on the PUSCH, the user terminal 100 uses a portion of the allocated resources to transmit the ACK/NACK on the PUSCH.

The user terminal 100 sends ACK/NACK feedback to the base station 20 only when it has been scheduled to receive data on the downlink shared channel. Due to the nature of the wireless communication channel, it is possible that the user terminal 100 may fail to decode a scheduling message transmitted on the PDCCH. If user terminal 100 fails to decode the scheduling message transmitted on the PDCCH, the base station 20 will receive user data on the PUSCH where it expects to receive the ACK/NACK feedback. There is some possibility in this situation for the base station 20 to misinterpret the user data transmitted on the PUSCH as a positive acknowledgement (ACK) when no acknowledgement was sent by the user terminal 100. This scenario is referred to herein as the "false ACK" scenario. In the case of a false ACK, base station 20 will think that user terminal 100 has successfully received the transmitted packet and will transmit new data the next time the user terminal 100 is scheduled on the downlink. Thus, user terminal 100 will have to rely on higher layer retransmission protocols (e.g., at the RRC level) to request the missing data, which may result in large delays.

Prior art attempts to solve the problem of "false ACKs" have focused on increasing the reliability of the ACK/NACK feedback to prevent the base station 20 from misinterpreting user data transmitted on the PUSCH as an ACK. The various embodiments of the present invention take an alternate approach to solve the problem of false detection of an ACK when the user terminal 100 is transmitting user data on the PUSCH. More specifically, embodiments of the present invention vary the reliability of the scheduling information transmitted to the user terminal 100 on the PDCCH depending on whether the user terminal 100 is expected to use the PUCCH or PUSCH for ACK/NACK feedback. When the user terminal 100 is expected to use the PUCCH for sending ACK/NACK feedback, the base station 20 may transmit scheduling information to the user terminal 100 on the PDCCH with normal reliability. For example, the base station 20 may control the signaling parameters used to transmit the scheduling information on the PDCCH to achieve an error rate of approximately 1%. When the ACK/NACK feedback is sent on the PUCCH, there is enough processing gain through repetition, spreading, and encoding to reduce the probability of an ACK being detected when no ACK/NACK feedback is sent to the order of 1%. Thus, the probability of a false ACK being detected by the base station 20 when the user terminal 100 is scheduled is in the order of $10^{-4}$ in the case where the PDCCH is transmitted with normal reliability and the ACK/NACK feedback is transmitted on the PUCCH.

When the user terminal 100 is expected to transmit the ACK/NACK feedback on the PUSCH, base station 20 may transmit the signaling information to user terminal 100 on the PDCCH with enhanced reliability. The reliability of the signaling information can be increased, for example, by increasing the transmit power on the PDCCH, increasing the aggregation level, or a combination thereof. As an example, the base station 20 may control the signaling parameters for the PDCCH to achieve an error rate in the order of 0.1% when enhanced reliability is required. Also, the signaling parameters for transmitting the ACK/NACK feedback on the PUSCH can be controlled to achieve an error rate of approximately 10%. Thus, the probability of a false ACK detection is $10^{-4}$ in the case where the base station 20 transmits the PDCCH with enhanced reliability and the user terminal 100 transmits the ACK/NACK signaling on the PUSCH.

The terms "normal reliability" and "enhanced reliability" as used herein do not denote a particular level of reliability, but are used as relative terms. The normal reliability indicates a baseline level of reliability, which may be any desired reliability level. The term "enhanced reliability" denotes a level of reliability greater than the baseline (normal) level. Similarly, the terms "low reliability" and "high reliability are intended as relative terms.

Figure 2:
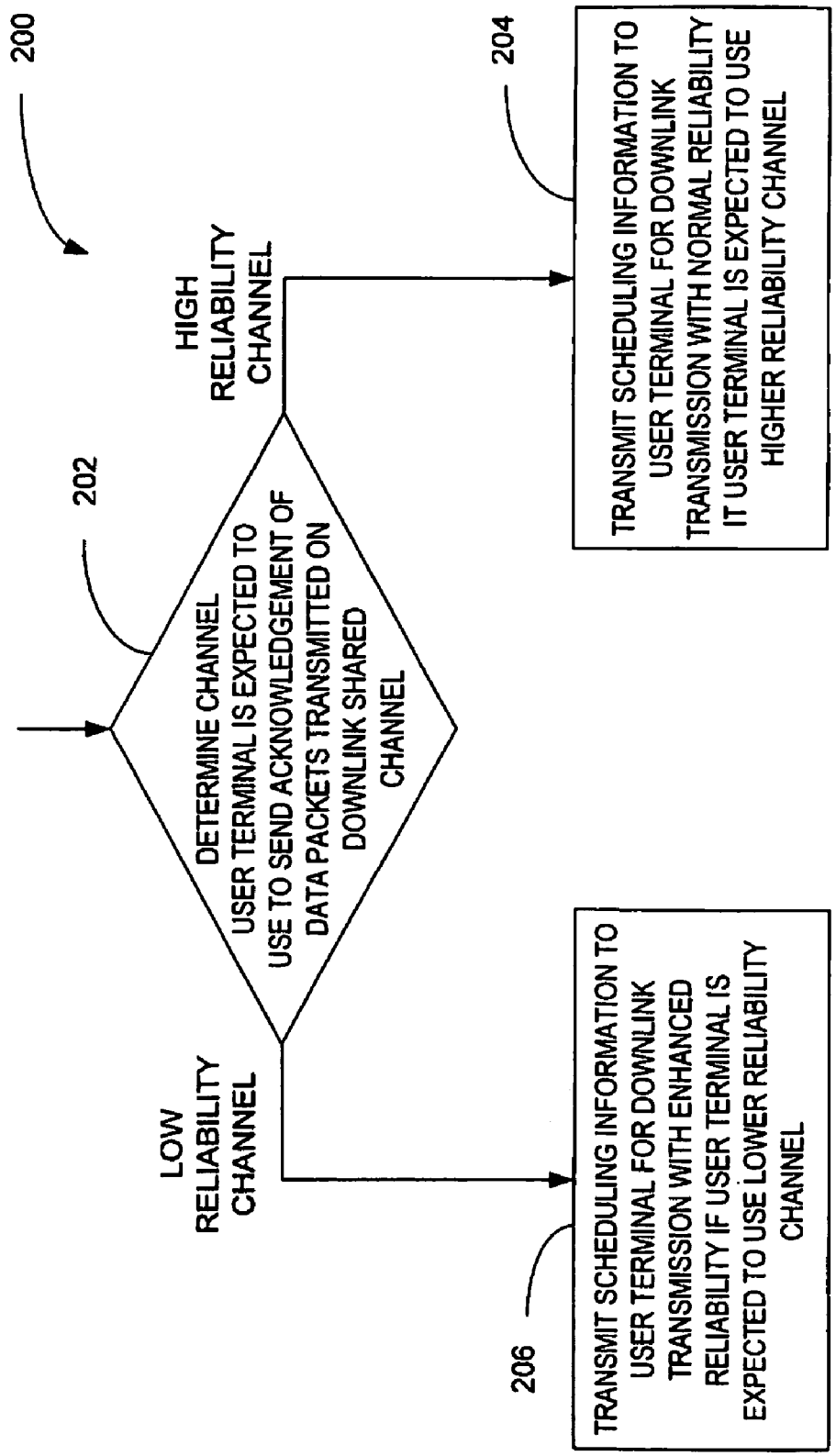
FIG. 2 illustrates an exemplary procedure for transmitting scheduling information to a user terminal scheduled to receive data on a downlink shared channel.

FIG. 2 illustrates an exemplary procedure 200 implemented by a base station 20 for transmitting control information associated with a data block to a user terminal 100 over a downlink shared channel. Procedure 200 is performed as part of a scheduling procedure when the user terminal 100 is scheduled to receive a downlink transmission. When user terminal 100 is scheduled to receive a downlink transmission, a scheduler at base station 20 determines what channel the user terminal 100 is expected to use for sending ACK/NACK feedback related to data packets transmitted on the downlink shared channel (block 202). In the case of LTE systems, as noted above, the user terminal 100 may use either the PUCCH or PUSCH for sending ACK/NACK feedback. In the exemplary embodiment, which is designed for use in an LTE system, the ACK/NACK feedback sent on the PUCCH has higher reliability than the ACK/NACK feedback sent on the PUSCH. If the scheduler at base station 20 expects the user terminal 100 to use the higher reliability channel (e.g., the PUCCH) for sending ACK/NACK feedback, the base station 20 transmits the scheduling information on the downlink control channel with normal reliability (block 204). On the other hand, if base station 20 expects the user terminal 100 to use the low reliability channel (e.g., the PUSCH) for sending ACK/NACK feedback, the base station 20 transmits the control information with enhanced reliability (block 206). Increasing the reliability of the control information transmitted on the PDCCH increases the probability that user terminal 100 will successfully decode the PDCCH and correspondingly reduce the probability of the user terminal 100 missing the scheduling information transmitted to it on the PDCCH.

Figure 3:
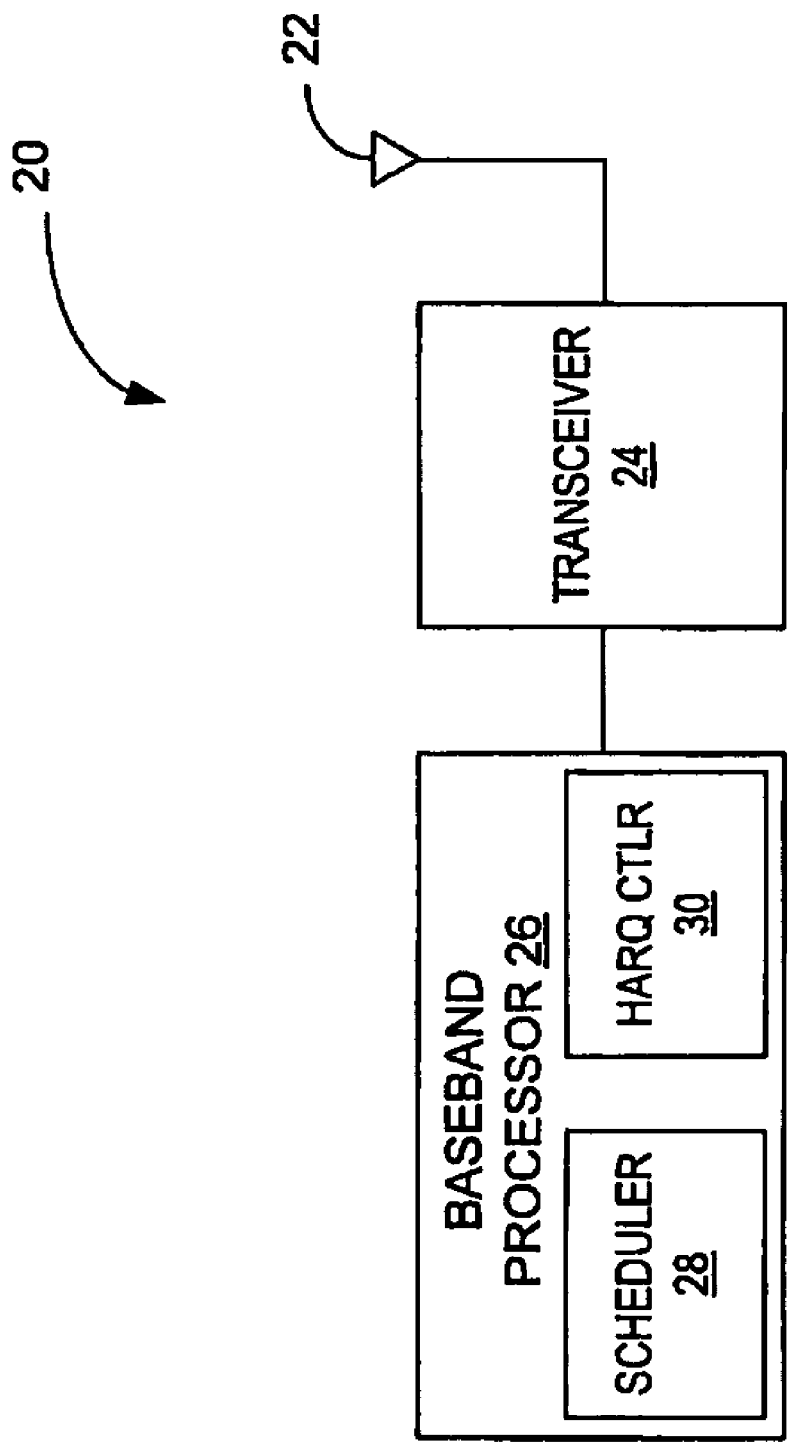
FIG. 3 illustrates an exemplary base station for a mobile communication system configured to schedule user terminal to receive data on a downlink shared channel and to transmit scheduling information to the user terminal on a downlink control channel.

FIG. 3 illustrates an exemplary base station 20 according to one embodiment of the invention. Base station 20 comprises a transceiver 24 coupled to an antenna 22, and baseband processor 26, which includes a scheduler 28 and HARQ controller 30. Transceiver 24 comprises a standard cellular transceiver operating according to any known standard, such as the LTE, WCDMA, and WiMax standards. Baseband processor 26 processes signals transmitted and received by the base station 20. Typical processing functions performed by the baseband processor 26 include modulation/demodulation, channel coding/decoding, interleaving/de-interleaving, etc. The baseband processor 26 may comprise one or more processors, microcontrollers, hardware circuits, or a combination thereof. Instructions executed by the baseband processor 26 may be stored in a computer readable medium, such as a solid state memory (e.g., ROM, Flash memory, etc.). Baseband processor 26 includes a scheduler 28 for scheduling user terminals 100 on the shared uplink and downlink channels, and an HARQ controller 30 for implementing HARQ protocols as previously described.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a base station of transmitting scheduling information associated with a data packet transmitted to a user terminal over a downlink shared channel to reduce false ACK detection in mobile communication systems, said method comprising:

determining whether a user terminal is expected to use a first uplink channel or a second uplink channel for sending acknowledgements of data packets transmitted to the user terminal on the downlink shared channel;

transmitting the scheduling information from said base station to said user terminal with normal reliability if the user terminal is expected to use the first uplink channel for sending said acknowledgements; and transmitting the scheduling information from said base station to said user terminal with enhanced reliability if the user terminal is expected to use the second uplink channel for sending said acknowledgements, wherein transmitting the scheduling information from said base station to said user terminal with normal reliability comprises transmitting said scheduling information with a selected aggregation level selected to achieve a desired error rate.

2. The method of claim 1 wherein transmitting the scheduling information from said base station to said user terminal with normal reliability comprises transmitting said scheduling information with a normal transmit power selected to achieve a desired error rate.

3. The method of claim 2 wherein transmitting the scheduling information from said base station to said user terminal with enhanced reliability comprises transmitting said scheduling information with increased transmit power relative to said normal transit power to reduce the desired error rate.

4. The method of claim 1 wherein transmitting the scheduling information from said base station to said user terminal with normal reliability comprises transmitting said scheduling information with a normal aggregation level selected to achieve a desired error rate.

5. The method of claim 4 wherein transmitting the scheduling information from said base station to said user terminal with enhanced reliability comprises transmitting said scheduling information with an increased aggregation level relative to said normal aggregation level to reduce the desired error rate.

6. The method of claim 1 for a Long Term Evolution system wherein the downlink shared channel comprises the Physical Downlink Shared Channel, and wherein the control information is transmitted by the base station to the user terminal on the Physical Downlink Control Channel.

7. The method of claim 6 wherein the first uplink channel comprises the Physical Uplink Control Channel, and wherein the second uplink channel comprises the Physical Uplink Shared Channel.

8. A base station for transmitting data to one or more user terminals over a shared downlink channel configured to reduce false ACK detection, said base station comprising:

a transceiver for transmitting signals to a user terminal over the shared downlink channel; and a baseband processor including a scheduler for scheduling transmissions to said user terminals on said downlink shared channel, said baseband processor configured to:

determine whether a user terminal is expected to use a first uplink channel or a second uplink channel for sending acknowledgements of data packets transmitted to the user terminal on the downlink shared channel;

transmit the scheduling information from said base station to said user terminal with normal reliability if the user terminal is expected to use the first uplink channel for sending said acknowledgements; and transmit the scheduling information from said base station to said user terminal with enhanced reliability if the user terminal is expected to use the second uplink channel for sending said acknowledgements, wherein the baseband processor transmits said scheduling information with normal reliability by transmitting said scheduling information with a selected aggregation level selected to achieve a desired error rate.

9. The base station of claim 8 wherein the baseband processor transmits said scheduling information with normal reliability by transmitting said scheduling information with a normal transmit power selected to achieve a desired error rate.

10. The base station of claim 9 wherein the baseband processor transmits said scheduling information with enhanced reliability by transmitting said scheduling information with increased transmit power relative to said normal transit power to reduce the desired error rate.

11. The base station of claim 8 wherein the baseband processor transmits said scheduling information with normal reliability by transmitting said scheduling information with a normal aggregation level selected to achieve a desired error rate.

12. The base station of claim 11 wherein the baseband processor transmits said scheduling information with enhanced reliability by transmitting said scheduling information with an increased aggregation level relative to said normal aggregation level to reduce the desired error rate.

13. The base station of claim 8 for a Long Term Evolution system wherein the downlink shared channel comprises the Physical Downlink Shared Channel, and wherein the control information is transmitted by the base station to the user terminal on the Physical Downlink Control Channel.

14. The base station of claim 13 wherein the first uplink channel comprises the Physical Uplink Control Channel, and wherein the second uplink channel comprises the Physical Uplink Shared Channel.

* * * * *

UNITED STATES PATENT AND TRADEMARK OFFICE
CERTIFICATE OF CORRECTION

PATENT NO. : 8,254,312 B2  Page 1 of 1
APPLICATION NO. : 12/466884
DATED : August 28, 2012
INVENTOR(S) : Cheng et al.

It is certified that error appears in the above-identified patent and that said Letters Patent is hereby corrected as shown below:

On the Title Page, in the Figure, for Tag "204", in Line 4, delete "IT" and insert -- IF --, therefor.

In Fig. 2, Sheet 2 of 3, for Tag "204", in Line 4, delete "IT" and insert -- IF --, therefor.

In Column 7, Line 24, in Claim 3, delete "transit" and insert -- transmit --, therefor.

In Column 8, Line 28, in Claim 10, delete "transit" and insert -- transmit --, therefor.

Signed and Sealed this
Thirteenth Day of November, 2012

David J. Kappos
*Director of the United States Patent and Trademark Office*